G. P. HELFRICH.
MOWER.
APPLICATION FILED MAR. 15, 1916.

1,203,331.

Patented Oct. 31, 1916.

WITNESSES
Geo. W. Naylor
A. L. Kitchin

INVENTOR
Gustav P. Helfrich
BY

ATTORNEYS

UNITED STATES PATENT OFFICE.

GUSTAV P. HELFRICH, OF NEW YORK, N. Y.

MOWER.

1,203,331.  Specification of Letters Patent.  Patented Oct. 31, 1916.

Application filed March 15, 1916. Serial No. 84,297.

*To all whom it may concern:*

Be it known that I, GUSTAV P. HELFRICH, a citizen of the United States, and a resident of the city of New York, borough of the Bronx, in the county of Bronx and State of New York, have invented a new and Improved Mower, of which the following is a full, clear, and exact description.

This invention relates to improvements in mowers and particularly to an improved mower in which the cutting member is given a circular motion together with a forward motion.

Another object in view is to provide an improved construction wherein there are provided a plurality of traction members and a single centrally arranged driving gear for operating the cutting member.

A still further object in view is to provide a mower having a cutting blade adapted to be moved in a circular path and mechanism for driving the same arranged so that there will be a driving gear and what may be termed a balancing or guiding gear.

Figure 1:
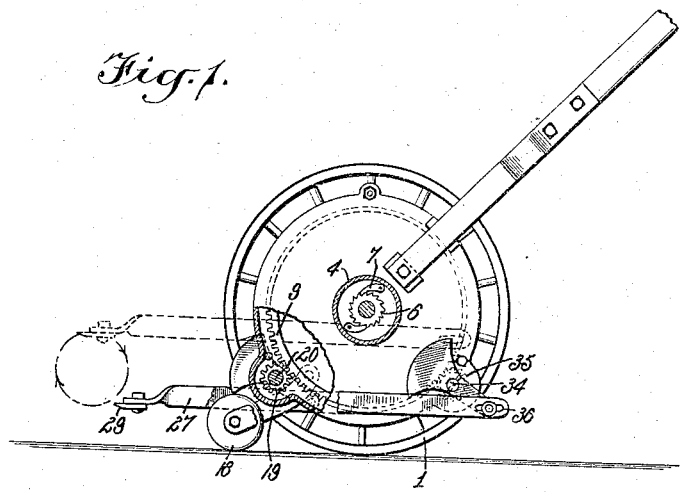
Figure 2:
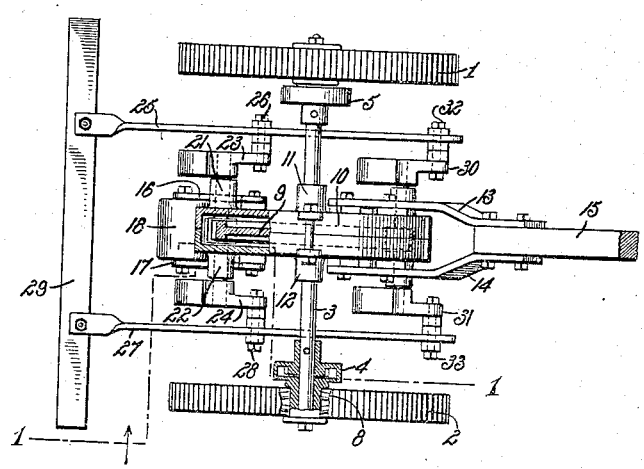
Figure 2:
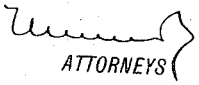

In the accompanying drawings: Figure 1 is a sectional view through Fig. 2 approximately on line 1—1. Fig. 2 is a top plan view of the mower shown in Fig. 1, certain parts being broken away for better illustrating the construction.

In forming the various parts of the mower embodying the present invention it is aimed to improve the driving mechanism of my former Patent Serial No. 1,134,851, issued April 6, 1915. To this end the traction wheels 1 and 2 are mounted loosely on the axle 3 but connected thereto by pawl and ratchet structures 4 and 5, respectively. As shown in Fig. 1, the ratchet wheel 6 is connected to the axle 3 while the pawl 7 is connected to the hub 8 of wheel 2. The pawl and ratchet 5 is similarly constructed and will therefore need no additional description. The axle 3 is rigidly secured to a master driving gear 9 arranged centrally of the device and normally covered by a casing 10, which casing is provided with hub members 11 and 12 mounted on the axle. Connected to the casing 10 are bars 13 and 14 to which the handle 15 is secured, whereby the entire device may be moved forwardly and rearwardly whenever desired. Also adjustably connected with the casing 10 are arms 16 and 17 which carry a roller 18 at the lower outer ends so as to regulate the height of cutting blade 29.

Arranged adjacent the front of the device is a pinion 19 meshing with the master gear 9 and rigidly secured to the shaft 20, which shaft extends through suitable bearing members 21 and 22. The outer ends of the shaft 20 extend beyond the members 21 and 22 and are rigidly secured to levers 23 and 24, which levers are provided with enlargements at one end so as to act as counter-balancing weights. The lever 23 is pivotally connected with the horizontal bar 25 by a bolt or pin 26, while the lever 24 is connected to the horizontal bar 27 through the bolt 28. As levers 23 and 24 rotate the bars will be given a similar motion, and as the knife or cutter blade 29 is secured to the forward end of these bars it will be moved as shown in dotted lines in Fig. 1. In order to hold these bars continually substantially horizontal they are connected to levers 30 and 31 through bolts 32 and 33, respectively, at the rear end.

The levers 30 and 31 are rigidly secured to the outer ends of the shaft 34, which shaft extends through and is rigidly secured to a pinion 35 continually meshing with the master gear 9. As shown more particularly in Fig. 1 the bolts 32 and 33 extend through slots 36 in the rear end of the bars 25 and 27 so that the levers 30 and 31 hold the bars in a horizontal position but do not interfere with the driving of the pinion 19. If the slots 36 were not provided but merely a round aperture for accommodating the bolts, the parts would not operate properly but the pinions would bind unless they were made absolutely accurately.

By the construction just described the pinions may be more or less inaccurate in their construction and yet operate perfectly satisfactorily, as there is really only one driving pinion, namely, pinion 19, while the other pinion acts as a guiding pinion. By providing the centrally arranged and master gear 9 and the traction wheels 1 and 2 together with the clutch mechanism between said wheels on the axle 3, the knife will operate when either wheel rotates or when both wheels rotate.

What I claim is:—

1. In a mower of the character described, a cutting blade, and means for moving said cutting blade in a circular path, said means including a pair of supporting and operating arms, a pair of power levers, a shaft connected to said power levers, a pinion connected to said shaft, a pair of guiding levers, means for connecting said guiding levers with said supporting bars, said means including bolts extending through said supporting bars, each of said supporting bars being formed with a slot accommodating said bolts, a pinion for operating said guiding levers, a gear wheel meshing with both of said pinions whereby the same are rotated simultaneously, a driving shaft connected to said gear wheel, and traction means for rotating said driving shaft.

2. In a mower of the character described, a cutting knife, a pair of supporting bars therefor, a pair of traction means, an axle, clutches for connecting said traction means with the axle, a master gear connected to said axle substantially centrally thereof, a pair of pinions meshing with said master gear, a shaft extending through each of said pinions and projecting an appreciable distance therefrom, a lever connected to each end of each of said shafts, and journal members connecting said levers with said supporting bars, each of the supporting bars having a slot on the journal members of one set of levers, whereby a loose motion effect will be produced at that point and the supporting bars will be driven by only one gear and guided by the other gear and parts connected therewith.

In testimony whereof I have signed my name to this specification in the presence of two subscribing witnesses.

GUSTAV P. HELFRICH.

Witnesses:
A. L. KITCHIN,
PHILIP D. ROLLHAUS.

Copies of this patent may be obtained for five cents each, by addressing the "Commissioner of Patents, Washington, D. C."